May 25, 1937.    R. H. PIERCE ET AL    2,081,557
TAFFRAIL SPEEDOMETER
Filed July 14, 1936    3 Sheets-Sheet 1
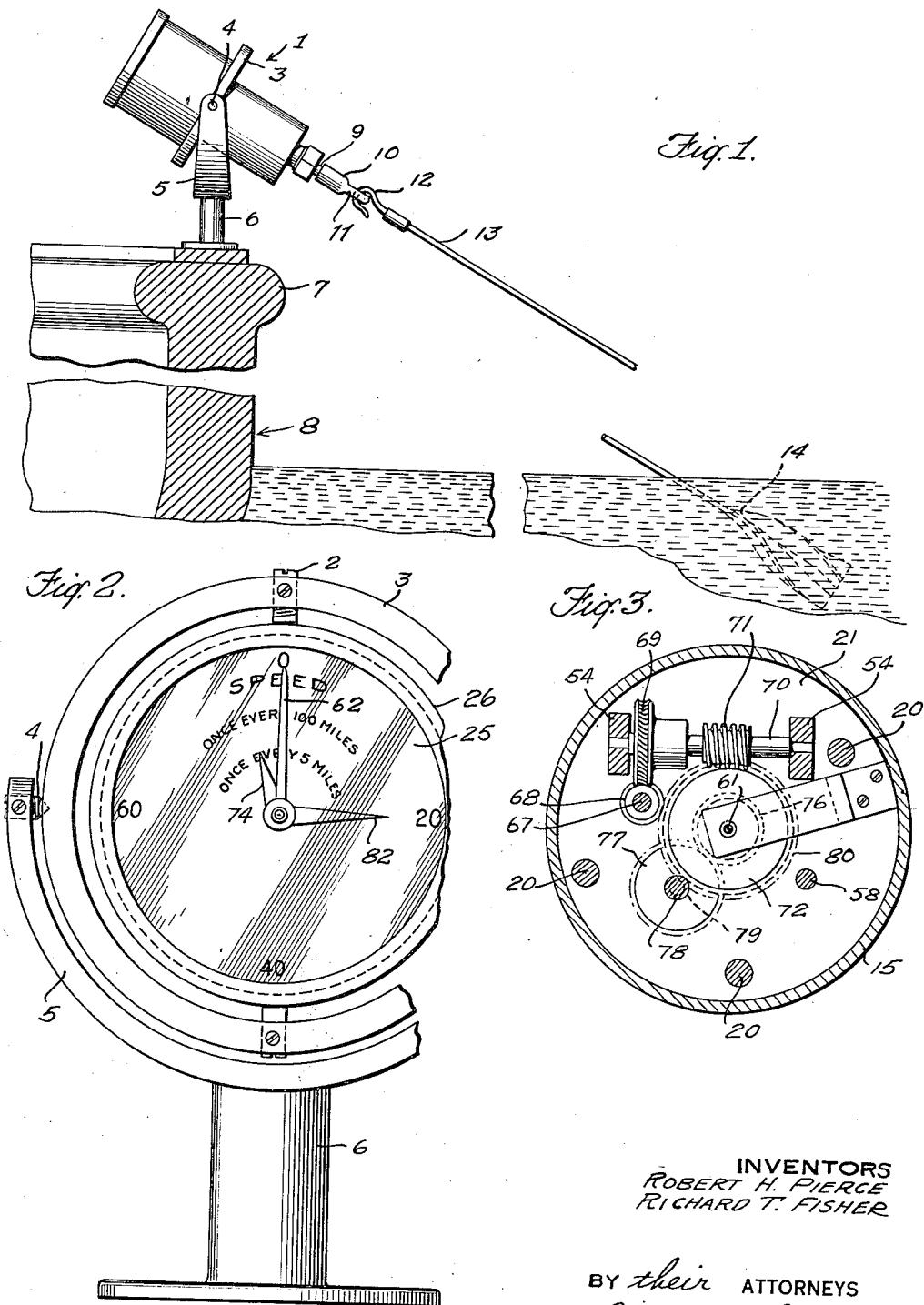
INVENTORS
ROBERT H. PIERCE
RICHARD T. FISHER
BY their ATTORNEYS
Moses + Nolte

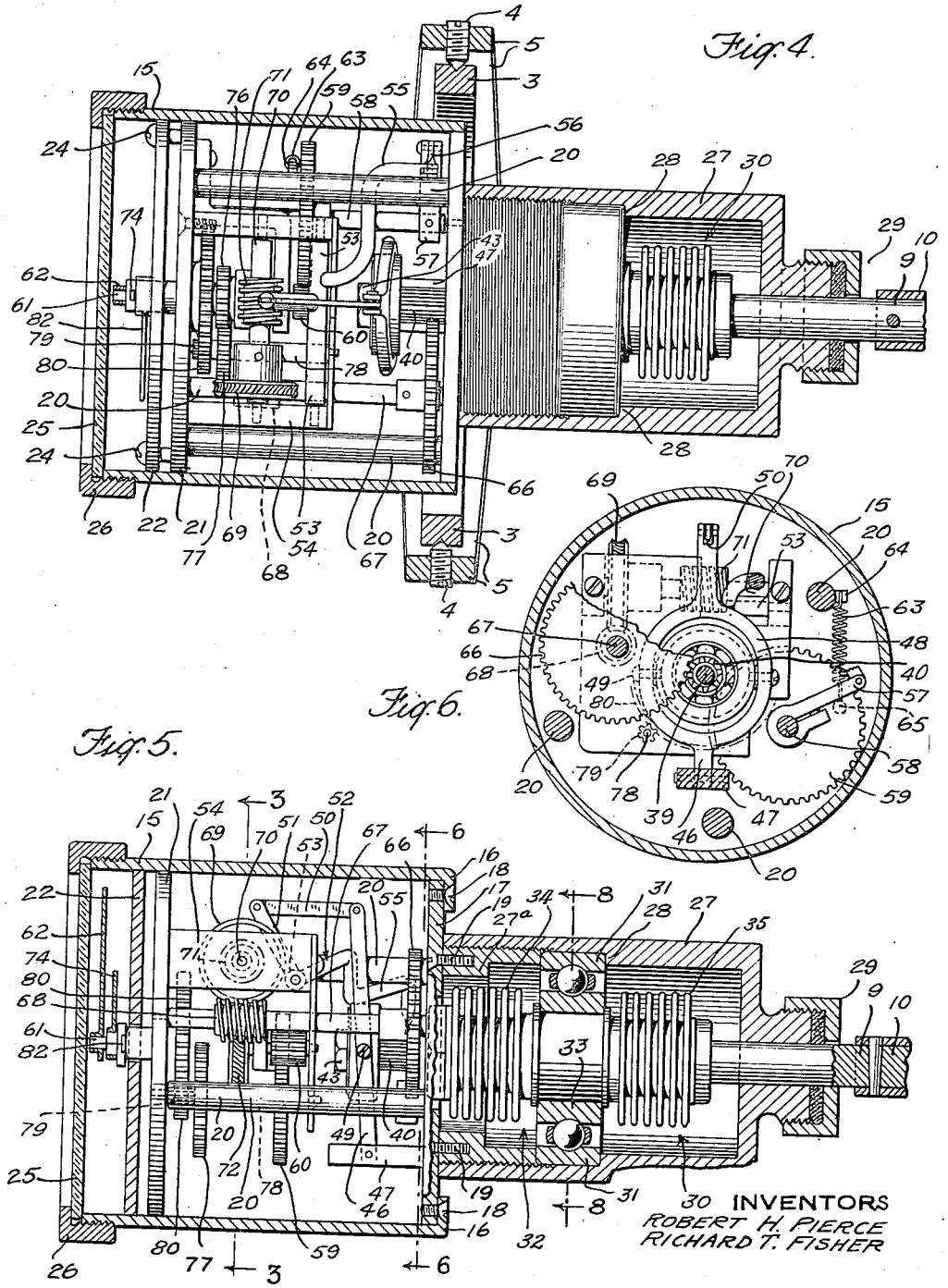

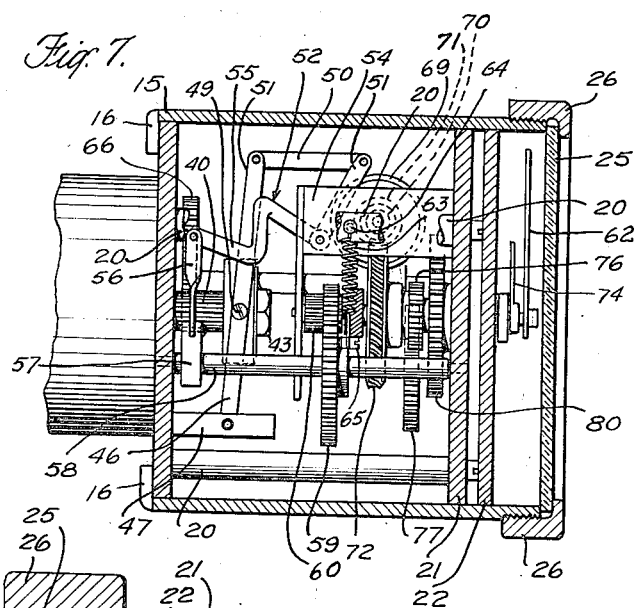
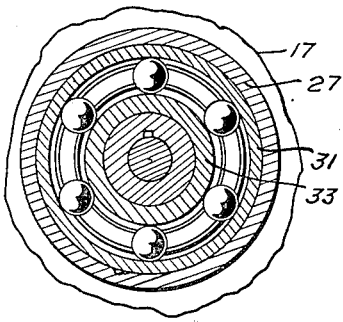
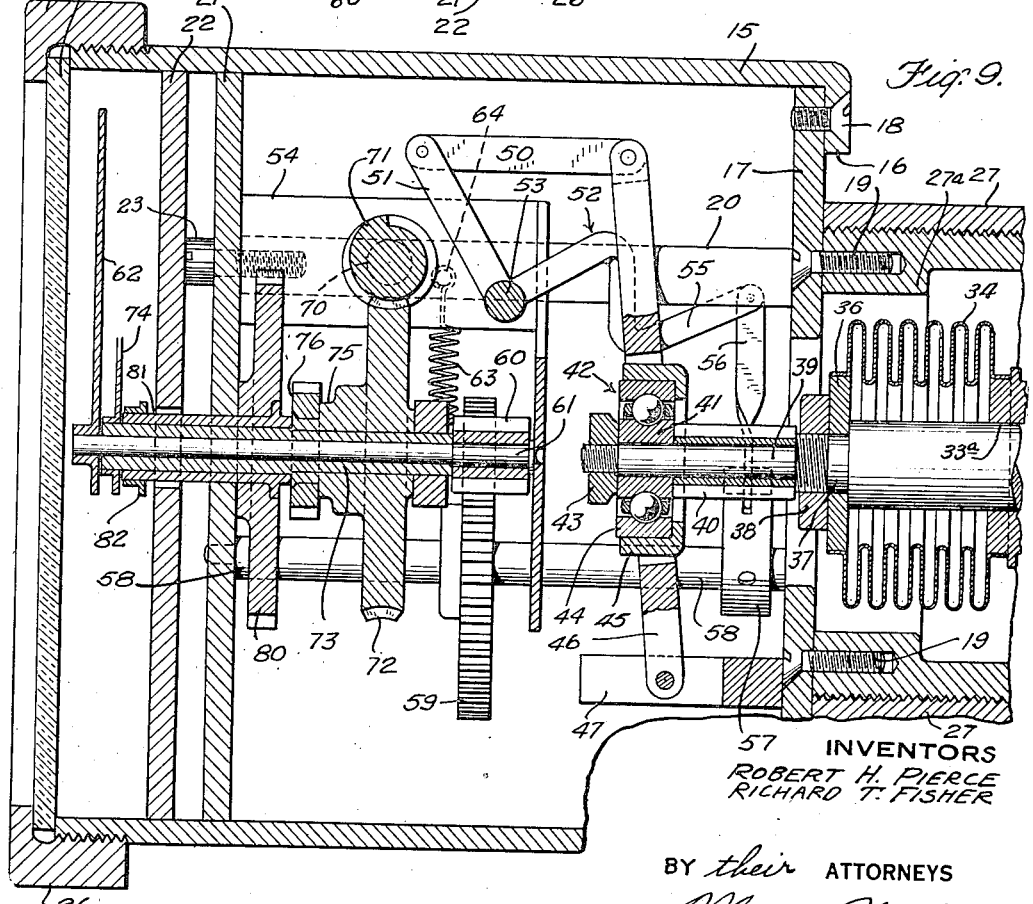

Patented May 25, 1937

2,081,557

UNITED STATES PATENT OFFICE 2,081,557

TAFFRAIL SPEEDOMETER

Robert H. Pierce, Duxbury, and Richard T. Fisher, Weston, Mass.

Application July 14, 1936, Serial No. 90,530

7 Claims. (Cl. 73—122)

This invention relates to a log for boats, which, in addition to the usual function of indicating the distance traveled, serves to indicate the approximate speed at which the boat is traveling.

When using the ordinary log the instrument proper is universally mounted upon a rail at the stern of the boat and a long cord connected to a revolvable shaft carries a spinner at its outer end which is rotated as it is dragged through the water. The rotation of the spinner turns the cord, and, through the cord, turns the shaft, so that through suitable gearing the distance traveled may be indicated by pointers or other suitable indicating means.

The present instrument embodies the above features, but in addition thereto utilizes the drag upon the spinner and line to pull the shaft axially more or less against the opposition of a yielding resistance. The drag upon the spinner and line varies with the speed of the boat, and hence the amount of axial displacement of the shaft depends upon the speed. Through suitable connections the axial movement of the shaft is translated into rotary movement so that a speed indicating pointer may be turned to indicate upon the dial of the instrument the approximate speed at which the boat is traveling.

Broadly stated, the instrument comprises means responsive to the rotation of the spinner to indicate the distance traveled, and means responsive to the pull of the spinner to indicate the speed.

The drag upon the spinner is not directly proportional to the speed of the boat, but is a function of an exponential power of the speed higher than unity. It is a feature of the present invention that provision is made of a variable transmission train for causing the rotational displacement of the pointer to be more nearly proportional to the speed, so that the axial range of movement of the shaft may be short and speed indications on the dial need not be crowded in any part of the operative range.

Other objects and advantages will hereinafter appear.

In the drawings forming part of this specification and illustrating a preferred embodiment of the invention, Fig. 1 is a fragmentary longitudinal sectional view showing the stern of a boat with an instrument embodying the present invention applied to it;

Fig. 2 is a fragmentary view in front elevation of the instrument for indicating the speed of the boat and the distance traveled;

Fig. 3 is a transverse sectional view through the instrument showing a portion of the operating mechanism, the section being taken on the line 3—3 of Fig. 5 looking in the direction of the arrows;

Fig. 4 is a longitudinal sectional view through the instrument head;

Fig. 5 is a longitudinal sectional view through the instrument head taken upon a different axial plane from Fig. 4;

Fig. 6 is a transverse sectional view through the instrument taken upon the line 6—6 of Fig. 5 looking in the direction of the arrows;

Fig. 7 is a transverse sectional view taken in the opposite direction from Fig. 5;

Fig. 8 is a fragmentary transverse sectional view taken on the line 8—8 of Fig. 5 looking in the direction of the arrows; and Fig. 9 is a fragmentary longitudinal sectional view showing a portion of the instrument of Fig. 1.

An instrument head 1 is shown in Figs. 1 and 2 as pivotally mounted upon bearings 2 carried by a ring 3. The ring 3 is pivotally mounted upon bearings 4 carried by a half ring 5 which, in turn, is fixedly carried by a post 6 attached to the stern rail 7 of a boat 8. The instrument includes a rearwardly extending shaft 9 having a cap 10 pinned to its rear end, the cap being formed with an eye 11 for reception of a hook 12. The hook 12 is connected to a cable or cord 13 which carries at its outer end a spinner 14. The spinner 14, which has spiral blades, is dragged in the water behind the boat. Because of the spiral form of the spinner blades, the spinner rotates as it travels through the water. The rotation of the propeller is imparted to the cord or cable 13 and thence to the shaft 9.

The rotation of the shaft 9 is utilized by the instrument to indicate the distance traveled, while the pull upon the shaft 9 is utilized by the instrument to indicate the speed at which the boat is traveling. The mechanism for accomplishing these results is mounted within the instrument 1.

The instrument 1 comprises a casing member 15 having an inturned flange 16 at its rear end. A plate 17 is inserted into the casing member 15 from the front, and is secured to the flange 16 by screws 18. The plate 17 carries forwardly extending posts 20 which rigidly support a plate 21 situated in the forward portion of the casing, the plate 21 being attached to the posts by screws 23 which are threaded into the forward ends of the posts. The plate 21 carries a dial plate 22, the dial plate being spaced from the supporting plate 21 by the heads of the screws 23, and being held to the supporting plate by the screws 24. A circular glass cover 25 overlies the forward end of the casing member 15 and is clamped to the casing member by means of a threaded retaining ring 26.

All of the translating mechanism is mounted in that portion of the instrument head contained between the plate 17 and the plate 21. The plate 17 also has a rearwardly extending threaded tube 27a attached to it by screws 19. The plate 17, together with a shell member 27, forms a housing for a dash pot 30. The outer race member 31 of a ball bearing 32 is received between the end of the tube 27a and a shoulder 28 of the shell 27, and is clamped between them by the threading of the shell 27 onto the ring 27a. The ball bearing is thus fixed against longitudinal movement and holds against longitudinal movement a bearing member 33 in which the shaft 9 is slidingly supported. A cap 29 is threaded onto a reduced portion of the shell 27 and holds a suitable packing compressed around the shaft.

The bearing member 33 has bellows 34 and 35 sealed to its opposite ends. These bellows are made of any suitable thin resilient sheet metal or alloy, such as brass or bronze. The bellows 34 is sealed to a disc 36 which surrounds a reduced portion 37 of the shaft 9. A nut 38 threaded onto the reduced portion of the shaft 9 clamps the disc 36 firmly against a shoulder formed at the end of the reduced portion 37. The bellows 35 is similarly secured to the shaft 9. Both bellows are initially held under slight compression in mutually opposed relation. The bellows are filled with oil, so that as the bellows 34 is compressed by an increasing pull upon the shaft 9 via oil is forced out of the bellows 34, past the bearing member 33, and into the bellows 35. The passage 33a for the oil may be restricted to any extent desired so that the combination of bellows and bearing constitute both a spring for resisting the pull of the spinner and a dash pot for avoiding sudden changes in the position of the shaft 9 relative to the instrument casing.

The shaft 9 includes a further reduced portion 39 which extends forward beyond the nut 38 and which has fixed upon it a long pinion 40. Beyond the pinion 40 the shaft carries an inner bearing member 41 of a ball bearing 42. The bearing member 41 is fixed longitudinally on the shaft between the pinion 40 and a retaining nut 43 threaded on the extreme forward end of the shaft. The outer non-rotatable member 44 of the ball bearing 42 is carried in a ring 45. The entire bearing, including the ring 45, is free to move longitudinally with the shaft. A lever 46 which is pivoted upon a post 47 carried by the block 17 has a central, ring-like portion 48 which extends around the ring 45. The ring-like portion 48 is pivotally connected to the ring 45 by means of bearing pins 49.

As the forward end of the shaft moves rearward, the lever 46 will be swung clockwise as viewed in Figs. 5 and 9. The lever 44 is connected through a link 50 with one arm 51 of a bell crank lever 52. The lever 52 comprises as its fulcrum a shaft 53, which is pivotally supported in frame members 54 (see Fig. 4) carried by the plate 21. The lever 52 also comprises a bent arm 55 which is connected through a link 56 with a crank 57, the crank 57 being fast upon a shaft 58. The shaft 58 (see Fig. 9) carries a gear 59 which meshes with a pinion 60 fast upon a shaft 61. The shaft 61 extends forward through the dial plate and has fixed upon it at its forward end a speed indicating pointer 62.

As a result of the described operating train axial movement of the shaft 9 to the rear causes the pointer 62 to be moved clockwise (as viewed in Fig. 2) while axial movement of the shaft 9 in a forward direction causes the pointer to be returned counter-clockwise to the zero position.

As has been mentioned the rearward pull upon the propeller 14 and hence upon the shaft 9 increases more rapidly than the speed increases. As a consequence the speed indicating dial would have to be graduated with very fine graduations for moderate speeds and coarse graduations for the same increments at higher speeds if provision were not made to compensate for the non-linear character of the relation betwen speed and drag.

The lever 46 and the link 50 transmit movement of the shaft to the pointer in a non-linear relation, the tendency being toward compensation for the non-linear relation of speed to drag.

The dial may be graduated empirically to cause the speed to be correctly indicated for all values within the operating range. The compensating means described enable the scale to be open and easily read throughout the operating range.

The clockwise movement of the pointer 62 is also opposed by a light tension spring 63 which is secured at one end to a pin 64 carried by one of the posts 20 and at the other end to a pin 65 carried by the gear 59. (See Fig. 6.) The spring 63, however, is designed primarily to take up play in the mechanism.

The pinion 40 fast upon the reduced portion 39 of the shaft 9 drives mechanism for indicating the distance that the boat has traveled. The pinion 40 is made long so that it may be in mesh with a gear 66, which is driven by it, in all operating positions of the shaft 9. The gear 66 is fast upon a shaft 67 which extends forward and which carries a worm 68 for driving a worm wheel 69. The worm wheel 69 is fast upon a transverse shaft 70 which is rotatably mounted in the frame members 54. The shaft 70 has fast upon it a worm 71 which drives a worm wheel 72 fast upon a sleeve 73. The sleeve 73 is journaled upon the shaft 61 and extends forward beyond the dial. The sleeve 73 carries a pointer 74 which travels in proportion to the travel of the boat and hence may be used to indicate the distance traveled by the boat. The pointer 74 desirably makes one complete revolution for every five miles that the boat travels.

A hub portion 75 of the worm gear 72 desirably has fast upon it a pinion 76 which drives a larger gear 77 fast on a shaft 78. The shaft 78 also has fast upon it a small pinion 79 which drives a large gear 80 fast on a sleeve 81. The sleeve 81 is journaled upon the sleeve 73 and extends forward through the dial. The sleeve 81 carries at its forward end a pointer 82 which travels in proportion to the travel of the boat, but at a slower rate than the pointer 74. The reduction gearing consisting of gears 76, 77, pinion 79, and gear 80 as illustrated, causes the pointer 82 to make one revolution for each twenty revolutions of the pointer 74 so that if one revolution of the pointer 74 represents five miles of travel, one revolution of the pointer 82 represents one hundred miles of travel.

It will be seen that the instrument illustrated and described is effective to indicate both the speed and the distance traveled upon a single dial and that both the speed and distance indicators are operated from a common shaft, the distance indicator being responsive to rotation of the shaft, and the speed indicator being responsive to axial displacement of the shaft.

While we have illustrated and described in detail certain preferred forms of our invention, it is to be understood that changes may be made therein and the invention embodied in other structures. We do not, therefore, desire to limit ourselves to the specific constructions illustrated, but intend to cover our invention broadly in whatever form its principles may be utilized.

We claim:

1. An instrument for indicating the speed and the distance traveled by a boat comprising a spinner adapted to drag in the water behind the boat, a drag line to which the spinner is connected, means for yieldingly resisting the drag of the spinner, means responsive to the drag of the spinner for indicating the speed at which the boat is traveling, means responsive to rotation of the spinner for indicating the distance traveled, operating trains connecting the drag line with said indicating means comprising a common rotary shaft, a casing for housing both of said operating trains, and means supporting the casing for universal movement about a point located substantially in the axial line of the rotary shaft.

2. An instrument for indicating the speed and the distance traveled by a boat comprising a shaft mounted both for rotation and for axial displacement, means attached to the shaft and adapted to drag in the water behind the boat for rotating the shaft in proportion to the distance traveled and for exerting a pull upon the shaft which increases as the speed increases, means for yieldingly resisting the pull upon the shaft, means responsive to rotation of the shaft for indicating the distance traveled, and means responsive to the pull upon the shaft for indicating the speed at which the boat is traveling, a casing housing both indicating means and entered by the shaft, and means supporting the casing for universal movement about a point located substantially in the axis of the shaft.

3. An instrument for indicating the speed and the distance traveled by a boat comprising a shaft adapted to have a spinner connected to it, a rotatable bearing supported against bodily movement and slidingly supporting the shaft, rotary means connecting the shaft to the bearing to yieldingly resist axial movement of the shaft relative to the bearing, means responsive to axial movement of the shaft to indicate the speed of the boat, and means responsive to rotation of the shaft to indicate the distance traveled.

4. An instrument for indicating the speed and the distance traveled by a boat comprising a shaft adapted to have a spinner connected to it, a rotatable bearing supported against bodily movement and slidingly supporting the shaft, a pair of bellows sealed to the bearing at opposite sides thereof and sealed to the shaft at their ends remote from the bearing, said bellows and bearing jointly forming an oil filled chamber and a spring to oppose and damp axial movements of the shaft, means responsive to axial movements of the shaft to indicate the speed of the boat, and means responsive to rotation of the shaft to indicate the distance traveled.

5. In combination, an instrument for indicating the speed and the distance traveled by a boat comprising a dial, a pair of concentric shafts extending through the dial, pointers on the respective shafts, means for turning one of the shafts in accordance with the speed of the boat and for rotating the other shaft in proportion to the distance traveled by the boat, including a rotatable and axially displaceable operating shaft in alignment with said concentric shafts, and means supporting the instrument for universal movement about a point in the axial line of said shafts.

6. An instrument for indicating the speed of a boat comprising a drag line, a member connected to the drag line for bodily movement in response to the varying drag, a pair of spring bellows connected at their remote ends to said member, a bodily immovable member interposed between the bellows and connected to the adjacent ends of the bellows and forming a restricted channel of communication between them, said bellows being filled with liquid and opposing variable resistance to the movement of the bodily movable member, and means for translating movements of said member into speed indications.

7. In combination, a shaft and a device for supporting the shaft with capacity for rotary and longitudinal movement and for opposing resistance to the longitudinal movement of the shaft comprising a bearing member in which the shaft is slidingly mounted, means rotatably supporting the bearing member for holding it against bodily movement, and opposed communicating liquid filled bellows connected at their adjacent ends with the bearing member, and at their remote ends to the shaft, said bellows being rotatable in unison with the shaft and with the bearing member.

RICHARD T. FISHER.
ROBERT H. PIERCE.